(12) United States Patent
Fu et al.

(10) Patent No.: US 8,318,033 B2
(45) Date of Patent: Nov. 27, 2012

(54) CONDUCTIVE TAPE AND METHOD FOR MAKING THE SAME

(75) Inventors: Wei-Qi Fu, Beijing (CN); Liang Liu, Beijing (CN); Peng Liu, Beijing (CN); Yuan-Chao Yang, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 50 days.

(21) Appl. No.: 11/967,122

(22) Filed: Dec. 29, 2007

(65) Prior Publication Data

US 2008/0308295 A1    Dec. 18, 2008

(30) Foreign Application Priority Data

Jun. 15, 2007    (CN) .......................... 2007 1 0075060

(51) Int. Cl.
  B44C 1/22    (2006.01)
  C03C 15/00   (2006.01)
  C03C 25/68   (2006.01)
  C23F 1/00    (2006.01)
(52) U.S. Cl. ........................................... 216/52; 216/67
(58) Field of Classification Search .................. None
  See application file for complete search history.

(56) References Cited

U.S. PATENT DOCUMENTS

| | | | | |
|---|---|---|---|---|
| 3,832,598 A | * | 8/1974 | Oehmke et al. | 361/223 |
| 4,226,752 A | * | 10/1980 | Erickson et al. | 524/460 |
| 4,500,683 A | * | 2/1985 | Hori et al. | 524/533 |
| 6,924,335 B2 | * | 8/2005 | Fan et al. | 524/495 |
| 2004/0097635 A1 | | 5/2004 | Fan et al. | |
| 2005/0167647 A1 | * | 8/2005 | Huang et al. | 257/14 |
| 2006/0197066 A1 | | 9/2006 | Cheng et al. | |
| 2006/0234056 A1 | * | 10/2006 | Huang et al. | 428/408 |
| 2007/0059864 A1 | | 3/2007 | Huang et al. | |
| 2008/0081176 A1 | | 4/2008 | Huang et al. | |

FOREIGN PATENT DOCUMENTS

| | | |
|---|---|---|
| CN | 1831073 A | 9/2006 |
| CN | 1837147 | 9/2006 |
| TW | 200533736 | 10/2005 |
| TW | I256877 | 6/2006 |
| TW | 200636054 | 10/2006 |

OTHER PUBLICATIONS

Xie et al, Carbon Nanotube Arrays, 2000, Materials Science and Engineering A, vol. 286, pp. 11-15.*

* cited by examiner

Primary Examiner — Nadine Norton
Assistant Examiner — Stephanie Duclair
(74) Attorney, Agent, or Firm — Altis Law Group, Inc.

(57) ABSTRACT

The present invention relates to a conductive tape. The conductive tape includes a adhesive layer and a plurality of carbon nanotubes. The adhesive layer has a first surface and an opposite second surface. The carbon nanotubes are substantially embedded in parallel in the adhesive layer and perpendicular to the first surface and the second surface. Each of the carbon nanotubes has two opposite ends extending out of the two opposite surfaces of the adhesive layer respectively. Further, a method for making the above-described conductive tape is also included.

12 Claims, 2 Drawing Sheets

CONDUCTIVE TAPE AND METHOD FOR MAKING THE SAME

RELATED APPLICATIONS

This application is related to common-assigned applications entitled, "CONDUCTIVE TAPE AND METHOD FOR MAKING THE SAME", filed Dec. 29, 2007 Ser. No. 11/967,123; "CONDUCTIVE TAPE AND METHOD FOR MAKING THE SAME", Dec. 29, 2007 Ser. No. 11/967,115. Disclosures of the above-identified applications are incorporated herein by reference.

BACKGROUND

1. Field of the Invention

The invention generally relates to conductive tapes and methods for making the same, and, particularly, to a conductive tape including array of carbon nanotubes and a method for the same.

2. Discussion of Related Art

During scanning electron microscopy (SEM) and X-ray spectroscopy (EDS) analysis, a conductive adhesive material is usually needed to fix samples for observation. Currently, Carbon Conductive Tape (CCT) is widely used as the adhesive and conductive material. The CCT includes amorphous carbon.

However, the CCT has the following drawbacks. Firstly, electrical resistance of the CCT is relatively large, generally about 700 Kilo Ohm/centimeter (KΩ/cm). Secondly, production cost of the CCT is relatively high.

What is needed, therefore, is a conductive tape, which has a low electrical resistance and good conductivity, and a method for making the same, which has low production cost.

SUMMARY

A conductive tape includes an adhesive layer and a plurality of carbon nanotubes. The adhesive layer has a first surface and an opposite second surface. The carbon nanotubes are substantially embedded in parallel in the adhesive layer and perpendicular to the first surface and the second surface. Each of the carbon nanotubes has two opposite ends extending out of the two opposite surfaces of the adhesive layer respectively.

Other advantages and novel features of the present conductive tape and method for making the same will become more apparent from the following detailed description of present embodiments when taken in conjunction with the accompanying drawings.

BRIEF DESCRIPTION OF THE DRAWINGS

Many aspects of the present conductive tape and method for making the same can be better understood with reference to the following drawings. The components in the drawings are not necessarily to scale, the emphasis instead being placed upon clearly illustrating the principles of the present conductive tape and method for making the same.

Figure 1:
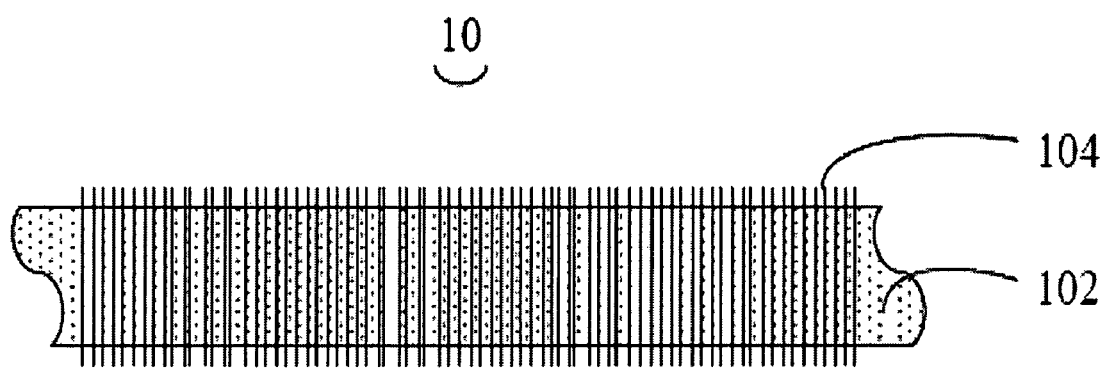
FIG. 1 is shows a sectional and schematic view of a conductive tape in accordance with the present embodiment.

Corresponding reference characters indicate corresponding parts throughout the several views. The exemplifications set out herein illustrate at least one present embodiment of the conductive tape and method for making the same, in at least one form, and such exemplifications are not to be construed as limiting the scope of the invention in any manner.

DETAILED DESCRIPTION OF PREFERRED EMBODIMENTS

Reference will now be made to the drawings, in detail, to describe embodiments of the conductive tape and method for making the same.

Referring to FIG. 1, a conductive tape 10 is provided in the present embodiment. The conductive tape 10 includes an adhesive layer 102 and a plurality of carbon nanotubes 104. The adhesive layer 102 has a first surface and an opposite second surface. The carbon nanotubes 104 are substantially embedded in parallel in the adhesive layer 102 and perpendicular to the first surface and the second surface. Each of the carbon nanotubes 104 has two opposite ends extending out of the two opposite surfaces of the adhesive layer 102 respectively.

The carbon nanotubes 104 in the conductive tape 10 exist in the form of an array. The carbon nanotubes 104 are selected from the group consisting of single-walled carbon nanotubes, and multi-walled carbon nanotubes. The array of carbon nanotubes is formed by one of a chemical vapor deposition method, an arc discharge method, and a laser evaporation method. Quite suitably, the array of carbon nanotubes is a super-aligned array of carbon nanotubes. Further the adhesive layer 102 includes a pressure sensitive adhesive layer.

Figure 2:
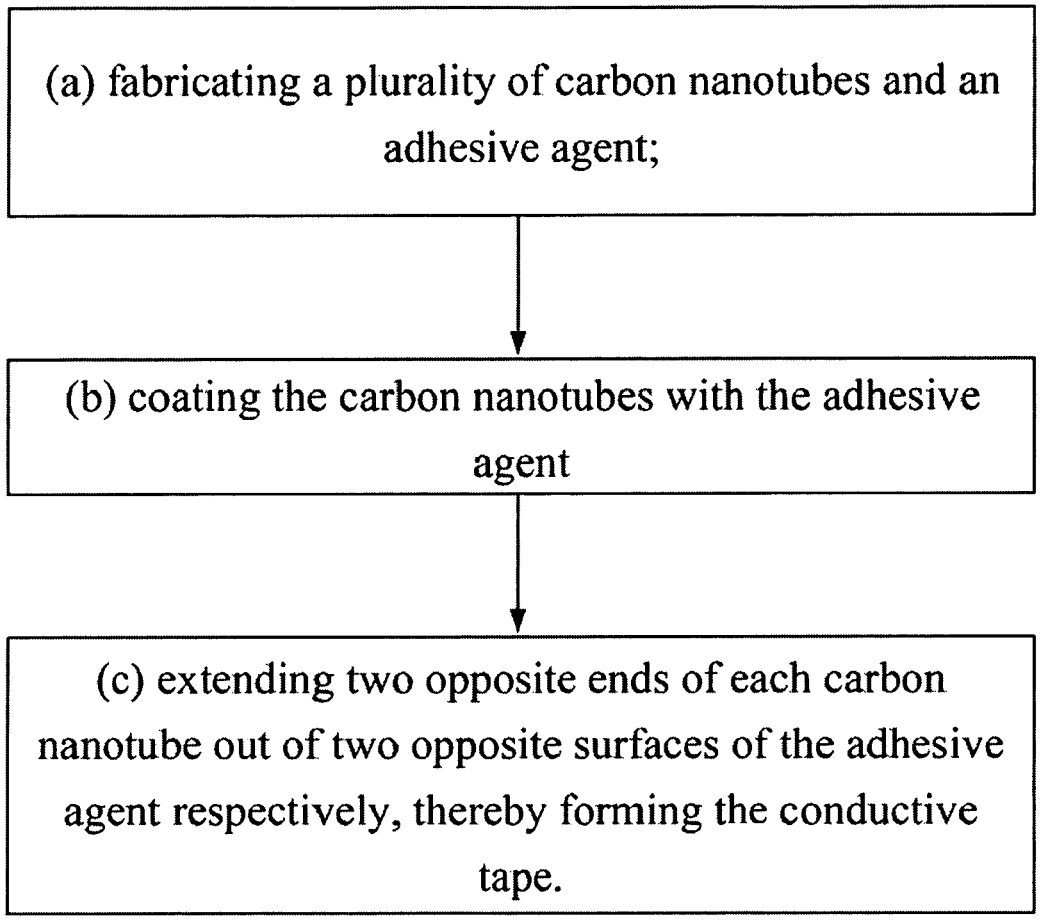
FIG. 2 is a flow chart of a method for making the conductive tape shown in the FIG. 1.

Referring to FIG. 2, a method for making a conductive tape 10 is provided in the present embodiment. The method includes the steps of: (a) fabricating a plurality of carbon nanotubes and an adhesive agent; (b) coating the carbon nanotubes with the adhesive agent; and (c) extending two opposite ends of each carbon nanotubes out of the two opposite surfaces of the adhesive agent respectively, thereby forming the conductive tape.

In step (a), the carbon nanotubes are arranged as an array of carbon nanotubes, quite suitably, a super-aligned array of carbon nanotubes. The given super-aligned array of carbon nanotubes can be formed by the steps of: (a1) providing a substantially flat and smooth substrate; (a2) forming a catalyst layer on the substrate; (a3) annealing the substrate with the catalyst layer in air at a temperature in the approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing a super-aligned array of carbon nanotubes on the substrate.

In step (a1), the substrate can, beneficially, be a P-type silicon wafer, an N-type silicon wafer, or a silicon wafer with a film of silicon dioxide thereon. Preferably, a 4-inch P-type silicon wafer is used as the substrate.

In step (a2), the catalyst can, advantageously, be made of iron (Fe), cobalt (Co), nickel (Ni), or any alloy thereof.

In step (a4), the protective gas can, beneficially, be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, have a height in the approximate range from 200 micrometers to 400 micrometers. And the super-aligned array includes a plurality of carbon nanotubes parallel to each other and approximately perpendicular to the substrate. Because the length of the carbon nanotubes is very long, portions of the carbon nanotubes are bundled together. Moreover, the super-aligned array of carbon nanotubes formed under the above conditions is essentially free of impurities such as carbonaceous or residual catalyst particles. The carbon nanotubes in the super-aligned array are closely packed together by the van der Waals attractive force.

It is to be noted that the array of carbon nanotubes can also, opportunely, be formed by chemical vapor deposition, arc discharge or laser evaporation.

In step (a), a method for making the adhesive agent is provided in the present embodiment. Specifically, butyl acrylate, 2-ethylhexyl acrylate, vinyl acetate, glycidyl methacrylate, acrylic acid, benzoyl peroxide, toluene and ethyl acetate are mixed and uniformly dispersed, thereby forming the adhesive agent. Quite suitably, a mass ratio of the above-described substances is 112.5:116.5:12.5:1.25:7.5:0.5:87.5: 162.5 in that order. A process of dispersing is selected from the group consisting of a cell breaking method and an ultrasonic vibrating method. Further, due to high cohesion and bonding strength of the adhesive agent, it can be used to fabricate adhesive tapes, self-adhesive labels, double-sided adhesive tapes, and other adhesive products. When the adhesive agent is used for double-sided adhesive tapes, its adhesive strength is up to 5.6 N/cm. Understandably, the mass percent of the above-described substances can, advantageously, be selected according to practical needs.

In step (b), a process of coating the carbon nanotubes with the adhesive agent includes the substeps of: (b1) reversely disposing the array of carbon nanotubes in a container, a depth of the container being greater than a length of the array of carbon nanotubes; and (b2) pouring the adhesive agent in the container, and filled up the container.

In step (b1), the array of carbon nanotubes formed on the substrate is reversely disposed in the container. That is, the array of carbon nanotubes is located at the bottom of the container, and the substrate is located at top of the container. The container is selected from the group consisting of glass containers and iron containers. In step (b2), the array of carbon nanotubes is immersed in the adhesive agent, and the adhesive agent is filled into the gaps of the carbon nanotubes.

In step (c), a process of the extending two opposite ends of each carbon nanotubes out of the two opposite surfaces of the adhesive agent includes the substeps of: (c1), taking the array of carbon nanotubes out of the container, after the adhesive agent solidifies; (c2) fixing the substrate and free ends of the array of the carbon nanotubes along a direction substantially perpendicular to the growth direction of the array of carbon nanotubes; and (c3) cutting the array of carbon nanotubes with a plurality of parallel knives, thereby forming a plurality of carbon nanotube slices coated with the adhesive agent (i.e. a plurality of adhesive conductive tapes).

In step (c1), a process of solidifying the adhesive agent is selected from the group consisting of a natural solidifying method and an artificial solidifying method. The artificial solidifying method includes air-drying, heat-drying, or a combination thereof. In step (c2), the substrate is fixed to a platform by a clamp or an adhesive tape. Because the free ends of the array of carbon nanotubes is an adhesive agent, a thick piece of cardboard is used to adhere to the free ends of the array of the carbon nanotubes. Quite suitably, the platform and the thick cardboard are parallel to each other.

In step (c3), each of the carbon nanotube slices is a conductive tape. A distance of the adjacent knives is the thickness of the conductive tape. Understandably, due to the carbon nanotubes existing in the form of an array and being substantially parallel to each other, the formed conductive tape by cutting with knives includes a plurality of carbon nanotubes. Each of the carbon nanotubes has two opposite ends exposed to the air.

Further, the step (c) can be accomplished by a reactive ion etching process to obtain the conductive tape. The etching process includes the steps of: (c1') taking the array of carbon nanotubes out of the container; (c2') removing the substrate from the array of carbon nanotubes; and (c3') etching the adhesive agent by reactive ions to opposite ends of each carbon nanotube extending out of the adhesive agent. In the preferred embodiment, the reactive ion etching processes are carried out using $O_2$ plasma. It is to be understood that an etching speed of the carbon nanotubes is slower than that of the adhesive agent. Thus, after the etching process, the two opposite ends of the carbon nanotube protrude out of the two opposite surfaces of the adhesive agent respectively. It is noted that, after solidifying in the step (c), the adhesive agent is the adhesive layer 102 in the present embodiment.

The conductive tape in the present embodiment has a plurality of carbon nanotubes substantially embedded in parallel in the adhesive layer and perpendicular to the first surface and the second surface. And each of the carbon nanotubes has two opposite ends extending out of the two opposite surfaces of the adhesive layer respectively. Thus, the conductive tape 10 has good electrical conductivity and low electrical resistance. Moreover, the method in the present embodiments employs relatively few carbon nanotubes to obtain the same electrical conductivity of CCT. Thus, the method for making the conductive tape 10 has a low production cost.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A method for making a conductive tape, the method comprising the steps of:
   (a) fabricating a plurality of carbon nanotubes and an adhesive agent comprising substeps of:
      (a1), forming an array of carbon nanotubes by a chemical vapor deposition method on a substrate;
      (a2), mixing and dispersing butyl acrylate, 2-ethylhexyl acrylate, vinyl acetate, glycidyl methacrylate, acrylic acid, benzoyl peroxide, toluene and ethyl acetate to form the adhesive agent;
   (b) coating the carbon nanotubes with the adhesive agent comprising substeps of:
      (b1), disposing the array of carbon nanotubes in a container, a depth of the container being greater than a length of the array of carbon nanotubes; and
      (b2), filling the container with the adhesive agent; and
   (c) extending two opposite ends of each carbon nanotube out of the adhesive agent from two opposite surfaces of the adhesive agent respectively, thereby forming the conductive tape.

2. The method as claimed in claim 1, wherein step (c) further comprises the substeps of:
   (c1) taking the array of carbon nanotubes out of the container after the adhesive agent has been solidified;
   (c2) fixing the substrate and free ends of the array of the carbon nanotubes along a direction substantially perpendicular to the growth direction of the array of carbon nanotubes; and
   (c3) cutting the array of carbon nanotubes with a plurality of parallel knives, thereby forming a plurality of conductive tapes.

3. The method as claimed in claim 2, wherein in step (c1), a process of solidifying the adhesive agent is selected from the group consisting of a natural solidifying method and an artificial solidifying method.

4. The method as claimed in claim 3, wherein the artificial solidifying method is selected from the group consisting of an air-dried method and a heat-dried method.

5. The method as claimed in claim 1, wherein in step (c), a reactive ion etching process is executed to obtain the conductive tape.

6. The method as claimed in claim 5, wherein the etching process comprises the steps of:
(c2') removing the substrate from the array of carbon nanotubes; and
(c3') etching the adhesive agent by reactive ions to ensure opposite ends of each carbon nanotube extending out of the adhesive agent.

7. The method as claimed in claim 6, wherein the reactive ion etching process is carried out using $O_2$ plasma.

8. The method as claimed in claim 6, wherein in step (c3'), an etching speed of the carbon nanotubes is slower than that of the adhesive agent.

9. The method as claimed in claim 1, wherein the process of dispersing is an ultrasonic vibrating method.

10. The method as claimed in claim 1, wherein in step (b2), the array of carbon nanotubes is immersed in the adhesive agent, and the adhesive agent fills gaps between the carbon nanotubes.

11. The method as claimed in claim 1, wherein a mass ratio of the butyl acrylate, 2-ethylhexyl acrylate, vinyl acetate, glycidyl methacrylate, acrylic acid, benzoyl peroxide, toluene and ethyl acetate is about 112.5:116.5:12.5:1.25:7.5:0.5:87.5:162.5.

12. The method as claimed in claim 1, wherein the array of carbon nanotubes is disposed upside down in the container, and the substrate is located above the array of carbon nanotubes, which is located at a bottom of the container.

* * * * *